US009132816B2

(12) United States Patent
Strehle et al.

(10) Patent No.: US 9,132,816 B2
(45) Date of Patent: Sep. 15, 2015

(54) METHOD FOR OPERATING A BRAKE SYSTEM OF A VEHICLE, AND BRAKE SYSTEM

(75) Inventors: Alfred Strehle, Fellbach (DE); Achim Eisele, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 184 days.

(21) Appl. No.: 13/520,149

(22) PCT Filed: Jan. 28, 2011

(86) PCT No.: PCT/EP2011/051214
§ 371 (c)(1),
(2), (4) Date: Sep. 28, 2012

(87) PCT Pub. No.: WO2011/104064
PCT Pub. Date: Sep. 1, 2011

(65) Prior Publication Data
US 2013/0009455 A1    Jan. 10, 2013

(30) Foreign Application Priority Data

Feb. 25, 2010    (DE) .......................... 10 2010 002 324

(51) Int. Cl.
*B60T 8/40*    (2006.01)
*B60T 8/42*    (2006.01)
*B60T 8/50*    (2006.01)
(Continued)

(52) U.S. Cl.
CPC ............. *B60T 8/4275* (2013.01); *B60T 8/4059* (2013.01); *B60T 8/5075* (2013.01); *B60T 13/142* (2013.01); *B60T 13/66* (2013.01)

(58) Field of Classification Search
CPC ... B60T 8/4059; B60T 8/4275; B60T 8/5075; B60T 13/142; B60T 13/66
USPC ........... 303/10, 11, 122.09, 122.12, 157, 158, 303/188, 191, 78, 80, 113.2, 189
See application file for complete search history.

(56) References Cited

U.S. PATENT DOCUMENTS 4,861,118 A    8/1989  Burckhardt et al.
5,806,939 A *  9/1998  Feigel et al. ................... 303/166
(Continued)

FOREIGN PATENT DOCUMENTS

CN    1155261    7/1997
CN    1978258    6/2007
(Continued)

OTHER PUBLICATIONS

International Search Report, PCT International Application No. PCT/EP2011/051214, dated Jul. 18, 2011.

*Primary Examiner* — Thomas Irvin
(74) *Attorney, Agent, or Firm* — Kenyon & Kenyon LLP

(57) ABSTRACT

A brake system, and a method for operating a brake system of a vehicle. To reduce a braking force, brake fluid is able to be discharged from the braking device via a cross-section adjusting member which connects a delivery device to the braking device, in a controlled and/or regulated manner, into an intermediate reservoir and is delivered to the main brake cylinder using the delivery device. The discharge of the brake fluid from the braking device of the brake system takes place, at least at times, at a discharge volume flow that is greater than the maximum delivery volume flow of the delivery device, and when a certain operating state of the braking system occurs, the discharge volume flow is reduced.

16 Claims, 2 Drawing Sheets

(51) Int. Cl.
*B60T 13/14* (2006.01)
*B60T 13/66* (2006.01)

(56) References Cited

U.S. PATENT DOCUMENTS

| | | | | |
|---|---|---|---|---|
| 6,082,830 | A * | 7/2000 | Volz et al. | 303/113.4 |
| 6,289,271 | B1 * | 9/2001 | Isono et al. | 701/29.1 |
| 6,419,329 | B1 * | 7/2002 | Buschmann et al. | 303/113.1 |
| 6,499,812 | B1 * | 12/2002 | Gronau et al. | 303/113.1 |
| 6,682,154 | B1 | 1/2004 | Haeussler et al. | |
| 7,931,345 | B2 * | 4/2011 | Muller et al. | 303/10 |
| 8,025,345 | B2 * | 9/2011 | Hashida et al. | 303/113.4 |
| 8,498,794 | B2 * | 7/2013 | Kudo et al. | 701/83 |
| 2005/0023889 | A1 | 2/2005 | Kondo | |
| 2005/0173978 | A1 * | 8/2005 | Fennel et al. | 303/114.3 |
| 2005/0206228 | A1 * | 9/2005 | Ohtsu | 303/119.1 |
| 2006/0175895 | A1 * | 8/2006 | Mahlo et al. | 303/11 |
| 2006/0202552 | A1 * | 9/2006 | Magel et al. | 303/142 |
| 2008/0236959 | A1 * | 10/2008 | Hashida et al. | 188/72.2 |

FOREIGN PATENT DOCUMENTS

| | | |
|---|---|---|
| CN | 101489844 | 7/2009 |
| DE | 3839178 | 4/1990 |
| DE | 102008055663 | 6/2009 |
| DE | 19825139 | 12/2009 |

* cited by examiner

METHOD FOR OPERATING A BRAKE SYSTEM OF A VEHICLE, AND BRAKE SYSTEM

FIELD OF THE INVENTION

The present invention relates to a method for operating a brake system of a vehicle, the brake system having at least one braking device assigned to a wheel of the vehicle, which is provided for applying a braking force to the wheel and to which brake fluid from a main brake cylinder can be supplied, a delivery device connected to the braking device via a cross-section adjusting member and an intermediate reservoir; in order to reduce the braking force, brake fluid being able to be discharged from the braking device via the cross-section adjusting member, in a controlled and/or regulated manner, into the intermediate reservoir and delivered to the main brake cylinder using the delivery device. The present invention further relates to a brake system.

BACKGROUND INFORMATION

It is the task of the brake system such as that described above to improve the steering performance and the braking performance, the driving stability and/or the traction of the vehicle. Such a brake system is, for instance, an ABS brake system, an ASR brake system and/or an ESP brake system. The first of these is supposed to prevent the blocking of wheels of the vehicle during braking, in order to assure the best possible frictional connection between the wheel and the ground surface. The brake system has the at least one braking device, which is assigned to the at least one wheel of the vehicle. The braking force is able to be applied to the wheel using the braking device. For this purpose, the brake fluid is supplied from the main brake cylinder to the braking device, for instance, based on the operation of a brake pedal, which is connected to the main brake cylinder, by a driver of the vehicle. When brake fluid from the main brake cylinder is supplied to the braking device, the braking force on the wheel is accordingly built up or increased.

To reduce the braking force in a controlled manner, the brake system further has a cross-section adjusting member, an intermediate reservoir and a delivery device. The cross-section adjusting member is connected to the braking device in such a way that the brake fluid can be discharged from the latter in a controlled and/or regulated manner. The discharged fluid gets to the intermediate reservoir or to the delivery device. The delivery device is used to convey the brake fluid discharged from the braking device, either directly or from the intermediate reservoir, and to supply it again to the main brake cylinder, so that it is available again for generating braking force. The delivery device is characterized by a maximum delivery volume flow, that is, the maximum volume flow at which brake fluid is able to be conveyed into the main brake cylinder. The delivery device is usually designed so that the maximum delivery volume flow is greater than the maximum discharge volume flow that is able to occur in the brake system. The discharge volume flow, in this context, is the volume flow at which the brake fluid is discharged from the braking device or several braking devices, and thus gets into the intermediate reservoir or to the delivery device. In this way, it is supposed to be ensured that, at each operating state, the discharged brake fluid is able to be conveyed to the main brake cylinder. However, this is conditioned upon a comparatively large design of the delivery device.

SUMMARY

An example method for operating the brake system in accordance with the present invention may have the advantage that the delivery device of the brake system is able to be designed smaller, that is, having a lower power. This may be achieved, according to the present invention, in that the discharge of the brake fluid from the braking device of the brake system takes place, at least at times, at a discharge volume flow that is greater than the maximum delivery volume flow of the delivery device, and when a certain operating state of the brake system occurs, the discharge volume flow is reduced. "Volume flow" represents the quantity of brake fluid per unit of time. It could equally well be replaced by the concept "mass flow", the discharge volume flow then corresponding to a discharge mass flow and the maximum delivery volume flow corresponding to a maximum delivery mass flow. If the discharge volume flow is continuously greater than the maximum delivery volume flow, the intermediate reservoir fills up. When it is completely filled up, no additional brake fluid is able to be discharged from the braking device or the braking devices. Consequently, the functioning of the brake system, particularly of the ABS brake system, cannot be certainly ensured. Such a state must therefore be certainly avoided within the specified range of functioning.

If the discharge volume flow is greater than the maximum delivery volume flow, a negative volume balance exists, which means that more brake fluid is being discharged into the intermediate reservoir that the delivery device is able to convey to the main brake cylinder. Conventionally, this negative volume balance can be avoided by the appropriate dimensioning of the delivery device. In contrast, in accordance with the present invention, the delivery device is designed to be as small as possible, i.e., having as low as possible a delivery power. This being the case, it is admissible at least at times that the discharge volume flow is greater than the maximum delivery volume flow. In order to ensure the functional performance of the brake system in a durable manner, the discharge volume flow is reduced upon the occurrence or presence of the certain operating state of the brake system. In this context, the reduction takes place in comparison to a value of the discharge volume flow that would be selected in a normal operation, without the presence of the certain operating state. In this way, higher braking requirements could be applied with a present braking system, or, at given braking requirements, the braking system, and particularly the delivery device, could be diminished, that is, designed to have less power. The reduction of the discharge volume flow takes place only in critical operating states, which appear comparatively rarely in any case.

One refinement of the present invention provides that the certain operating state is a malfunction of the delivery device and/or the exceeding of a certain fluid level of the intermediate reservoir. In the first case, the discharge volume flow is reduced prophylactically, because it is foreseeable that the delivery device is not able to carry off the brake fluid sufficiently rapidly from the intermediate reservoir or from the braking device into the main brake cylinder. In addition or alternatively, the discharge volume flow may also be reduced upon the exceeding of the certain fluid level. In this way it may be prevented that the intermediate reservoir continues to fill up or fills up too rapidly, and that in this way, at least over a prolonged time span, the complete functioning performance of the brake system is ensured.

One refinement of the present invention provides that the discharge volume flow, in the case of the malfunction, is selected to be equal to, or less than the maximum delivery volume flow. The maximum delivery volume flow always corresponds to the maximum volume flow at which the brake fluid is able to be returned to the main brake cylinder. In the determination of the maximum delivery volume flow, ideally the malfunction of the delivery device is also taken into account. In this case, the maximum delivery volume flow is determined, for instance, using a model or from measured values. If there is a malfunction, it is meaningful to select the discharge volume flow to be equal, or less than the maximum delivery volume flow, so as to prevent the intermediate reservoir from filling up (too rapidly) and thus impairing the functioning performance of the brake system, at least partially. In this way, under normal conditions, that is, without the presence of the malfunction, the brake system can be used optimally, the delivery device being able to be designed to be smaller than a conventional device, and yet the functioning performance of the brake system is always ensured.

One refinement of the present invention provides that an operating voltage of the delivery device is monitored, and in the case of its falling below a certain minimum voltage, the malfunction is indicated. The malfunction is able to be revealed, for example, by an error in the voltage supply of the delivery device. The operating voltage is monitored for this reason. If it falls below a certain value, the minimum voltage, the malfunction is indicated, and as a result, the discharge volume flow is reduced. The reduction in the discharge volume flow, in this context, advantageously takes place with the aid of a comparison of the measured operating voltage to a nominal operating voltage.

One refinement of the present invention provides that the fluid level of the intermediate reservoir is determined with the aid of a fluid level model. The intermediate reservoir of the brake system usually has no fluid level indicator, using which the fluid level of the intermediate reservoir can be determined. For this reason, the fluid level is determined or estimated using the fluid level model. In this way, at least an approximate value for the fluid level can always be estimated. If the estimated fluid level exceeds the certain fluid level, the discharge volume flow is reduced. Of course, for determining the fluid level, in addition or alternatively, at least one sensor may also be provided.

One refinement of the present invention provides that the fluid level model has, as input variables, the discharge volume flow and at least one operating variable of the delivery device. Starting from an initial value, the fluid level is able to be determined, with the aid of the fluid level model, if at least the volume flows are known at which the brake fluid gets into the intermediate reservoir or out of it. The instantaneous delivery volume flow of the delivery device is an operating characteristic variable of the delivery device, in this context. In addition, further operating characteristic variables, such as the operating voltage of the delivery device, may also be used.

One refinement of the present invention provides that a plurality of braking devices is connected to the intermediate reservoir. In this case, the discharge volume flow corresponds to the volume flow at which the brake fluid is discharged from all the braking devices connected to the intermediate reservoir. Thus, the delivery device has to be in a position to carry off this combined discharge volume flow from the intermediate reservoir or from the braking devices.

One refinement of the present invention provides that, for reducing the discharge volume flow, supplying the brake fluid from the main cylinder takes place at a lower volume flow, and/or a waiting time between attaining a specified pressure in the braking device and the discharging of the brake fluid is selected to be greater, and/or the specified pressure to be attained during the supplying of the brake fluid is reduced. Using these measures, it can be achieved that brake fluid has to be discharged less often and in lesser quantity, via the cross-section adjusting member, from the braking device or the braking devices. If the brake fluid is supplied to the braking device using a lesser volume flow, the braking force in it increases more slowly, so that a reduction in the braking force only becomes necessary at a later point in time. These measures may also go along with a reduction in the regulating frequency of the brake system or the braking device. Additionally or alternatively, a pressure dwell time may be increased, which corresponds to the waiting time between attaining the specified pressure in the braking device and the discharging of the brake fluid. In this manner, too, a reduction in the regulating frequency is achieved. The brake system usually works in such a way that the brake fluid is supplied to the braking device until the attainment of a certain specified pressure, or rather, a specified braking force. Thereafter, the brake fluid is discharged from the braking device via the cross-section adjusting member. In order to reduce the discharge volume flow, this specified pressure may now be reduced, for instance, by a more sensitive activation of the pressure dwell phase. The values named are reduced or selected to be greater, in each case, compared to a value which would be selected in a normal operation of the brake system, that is, without the presence of the certain operating state.

One refinement of the present invention provides that, for the reduction of the discharge volume flow in a plurality of braking devices, the wheel having the greatest blocking inclination is not taken into account for controlling and/or regulating the brake fluid. Accordingly, in this specific embodiment, a plurality of braking devices is present, each being assigned to one wheel of the vehicle. Normally, at least two of the braking devices are controlled or regulated in common, so that brake fluid is discharged from these simultaneously if only one of the wheels has a certain blocking inclination ("select low" operation). This brings about the greatest driving stability of the vehicle, because the appearance of yaw torques or steering torques is prevented. To be sure, the braking distance of the vehicle also increases, because in the wheel or the wheels, which do not show the highest blocking inclination, only a lower braking force is set, than is possible. However, this "select low" operation also increases the discharge volume flow. In order to decrease this, the "select low" operation is accordingly prevented, and an individual control and/or regulation of each braking device is preferably carried out.

The present invention also relates to a brake system of a vehicle, particularly for implementing the method according to the above explanations, the brake system having at least one braking device assigned to a wheel of the vehicle, which is provided for applying a braking force to the wheel and to which brake fluid from a main brake cylinder can be supplied, and having a delivery device connected to the braking device via a cross-section adjusting member and an intermediate reservoir; in order to reduce the braking force, brake fluid being able to be discharged from the braking device via the cross-section adjusting member, in a controlled and/or regulated manner, into the intermediate reservoir and delivered to the main brake cylinder using the delivery device. The brake system, in this context, is developed so that the discharge of the brake fluid from the braking device of the brake system takes place, at least at times, at a discharge volume flow that is greater than the maximum delivery volume flow of the delivery device, and when a certain operating state of the braking system occurs, the discharge volume flow is reduced. The brake system of the vehicle may be further developed according to the above explanations.

The present invention is described in greater detail below with the aid of the exemplary embodiments shown in FIG. 1, FIG. 2A, and FIG. 2B, without a restriction of the present invention taking place.

DETAILED DESCRIPTION OF EXAMPLE EMBODIMENTS

Figure 1:
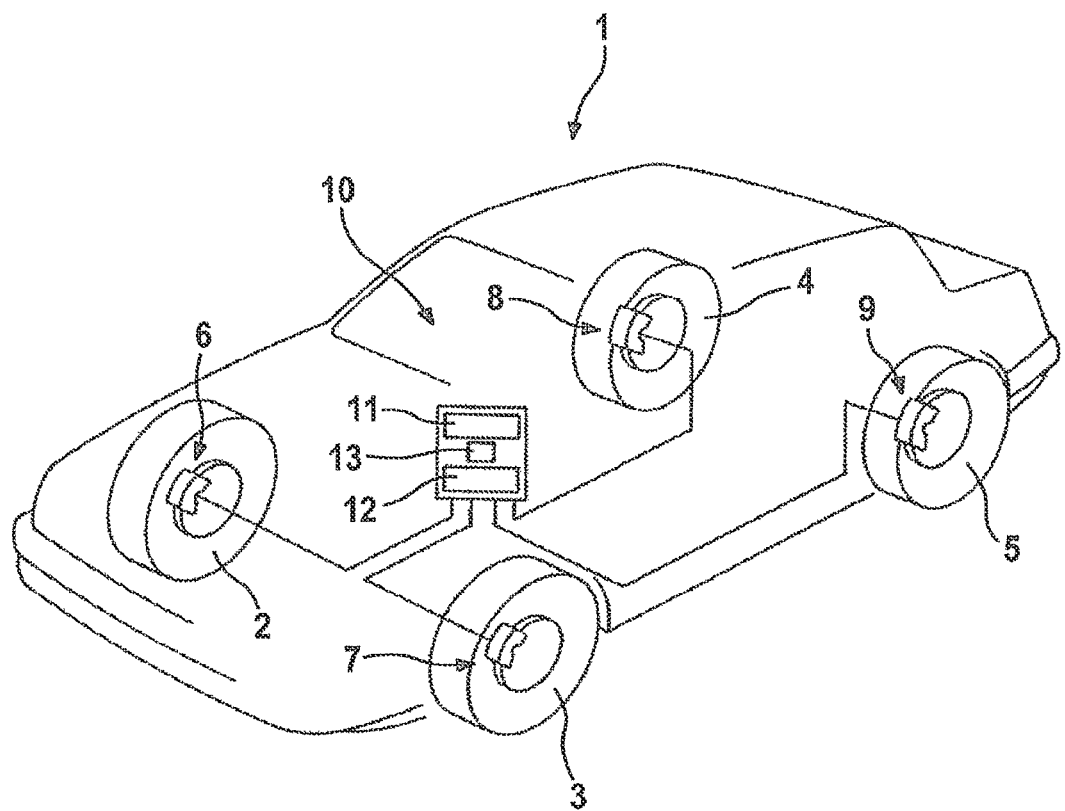
FIG. 1 shows a schematic view of a vehicle having a brake system.

FIG. 1 shows a vehicle 1 having wheels 2, 3, 4 and 5, to each of which a braking device 6, 7, 8 and 9 has been assigned. Braking devices 6, 7, 8 and 9 are components of a brake system 10 of vehicle 1. Braking devices 6 through 9 are each connected to a main brake cylinder 11, an intermediate reservoir 12, and a delivery device 13.

Figure 2A:
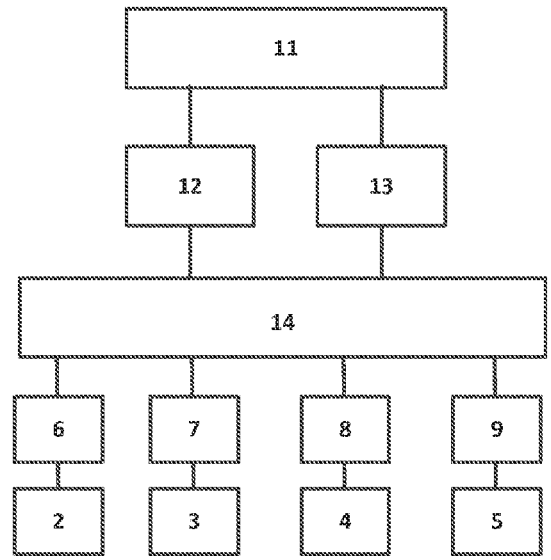
FIG. 2A and FIG. 2B show schematic views of the connections between the components in a vehicle having a brake system.
Figure 2B:
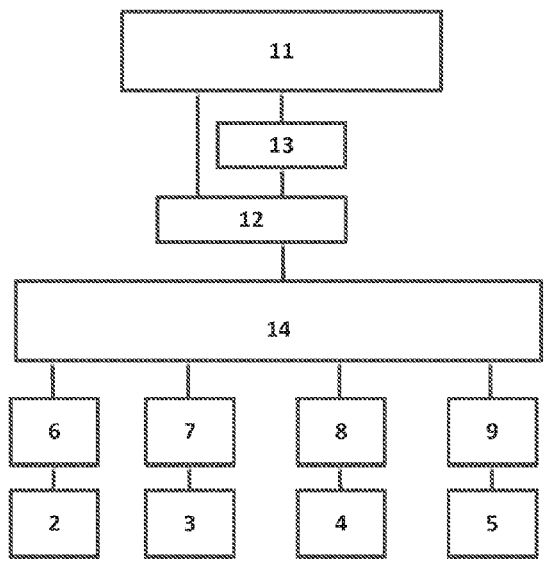

FIG. 2A and FIG. 2B show alternative embodiments facilitating connections between several components within vehicle 1. Braking devices 6 through 9 are each connected to an intermediate reservoir 12 and a delivery device 13, via a cross-section adjusting member 14. Brake fluid is able to be discharged in a controlled manner from braking devices 6 through 9 via the cross-section adjusting member 14, so as to reduce the braking force exerted on wheels 2 through 5. The brake fluid discharged via cross-section adjusting member 14 in a controlled and/or regulated manner reaches delivery device 13 or intermediate reservoir 12. The volume flow at which the brake fluid flows through the cross-section adjusting member 14 is designated as the discharge volume flow. The discharged brake fluid is reconveyed to main brake cylinder 11, using delivery device 13. Delivery device 13 is an electrical delivery pump, for example. The maximum delivery volume flow is characteristic for delivery device 13, that is, the volume flow that is able to be conveyed away maximally in the direction of main brake cylinder 11 using delivery device 13. If the discharge volume flow exceeds the maximum delivery volume flow, the brake fluid is not able to be conveyed away sufficiently rapidly from braking devices 6 through 9 into main brake cylinder 11, so that intermediate reservoir 12 fills up.

If intermediate reservoir 12 is completely filled up, no further brake fluid can be discharged from braking devices 6 through 9, so that the performance reliability of brake system 10 is at least partially impaired. This state should therefore be prevented. This is done by reducing the discharge volume flow upon the occurrence of a certain operating state of brake system 10. Brake system 10 is developed correspondingly, or is operated correspondingly. The certain operating state is present, for example, if a malfunction occurs of delivery device 13, or a certain fluid level of intermediate reservoir 12 is exceeded. In this case, the discharge volume flow is reduced, this ideally occurring so that it is less than, or equal to the maximum delivery volume flow of delivery device 13.

In this way, delivery device 13 and brake system 10 may be designed to be smaller or having less power than conventional devices, and yet the performance reliability of the brake system is implemented at all times. Consequently, the costs for brake system 10 are able to be reduced. In the reduction of the discharge volume flow, the criteria braking performance (braking distance), vehicle stability, discharge volume flow (volume consumption) and regulating comfort and robustness of the control/regulation are usually weighed with respect to one another. This enables one to achieve a compromise among the criteria named.

What is claimed is:

1. A method for operating a brake system of a vehicle, the brake system having at least one braking device assigned to a wheel of the vehicle, which is provided for applying a braking force to the wheel and to which brake fluid from a main brake cylinder is able to be supplied, and having a delivery device connected to the braking device via a cross-section adjusting member and an intermediate reservoir, the method comprising:

discharging brake fluid from the braking device via the cross-section adjusting member, in at least one of a controlled and regulated manner, into the intermediate reservoir and delivering the brake fluid to the main brake cylinder using the delivery device, the discharging of the brake fluid from the braking device of the brake system taking place, at least at times, at a discharge volume flow that is greater than a maximum delivery volume flow of the delivery device; and reducing the discharge volume flow when a certain operating state of the brake system occurs, wherein the cross-section adjusting member equalizes the pressure discharged from the at least one braking device using at least one valve.

2. The method as recited in claim 1, wherein the certain operating state is at least one of a malfunction of the delivery device, and an exceeding of a certain fluid level of the intermediate reservoir.

3. The method as recited in claim 2, wherein the discharge volume flow at the malfunction is selected to be equal to or less than the maximum delivery volume flow.

4. The method as recited in claim 2, further comprising:
monitoring an operating voltage of the delivery device, the malfunction being indicated in response to an undershooting of a certain minimum voltage.

5. The method as recited in claim 2, wherein the fluid level of the intermediate reservoir is determined with the aid of a fluid level model.

6. The method as recited in claim 5, wherein the fluid level model has as input variables the discharge volume flow and at least one operating variable of the delivery device.

7. The method as recited in claim 6, wherein the at least one operating variable is an operating voltage of the delivery device.

8. The method as recited in claim 5, wherein the discharge volume flow is reduced if the determined fluid level exceeds a threshold fluid level.

9. The method as recited in claim 5, wherein the fluid level of the intermediate reservoir is further determined with the aid of at least one sensor.

10. The method as recited in claim 1, wherein a plurality of braking devices is connected to the intermediate reservoir.

11. The method as recited in claim 1, wherein, to reduce the discharge volume flow, discharging the brake fluid less often and in lesser quantities from the braking device by performing at least one of: i) supplying a lower volume flow of the brake fluid from the main brake cylinder, ii) selecting a greater waiting time between attaining a specified pressure in the braking device and the discharging of the brake fluid, and iii) reducing a specified pressure to be attained during the supplying of the brake fluid.

12. The method as recited in claim 1, wherein for reducing the discharge volume flow in the case of a plurality of braking devices, a wheel having a greatest blocking inclination is not taken into account for the at least one of the control and the regulation of the discharging of the brake fluid.

13. The method as recited in claim 12, wherein in the case of the plurality of braking devices, each device is assigned to one of the wheels of the vehicle.

14. The method as recited in claim 1, wherein the delivery device is connected to at least four braking devices via the cross-section adjusting member and an intermediate reservoir, wherein to reduce the braking force, brake fluid is discharged from the at least four braking devices via the cross-section adjusting member, in at least one of a controlled and regulated manner, into the intermediate reservoir and is delivered to the main brake cylinder using the delivery device.

15. A brake system of a vehicle, comprising:
- at least one braking device assigned to a wheel of the vehicle, which is provided for applying a braking force to the wheel and to which brake fluid from a main brake cylinder is able to be supplied; and
- a delivery device connected to the braking device via a cross-section adjusting member and an intermediate reservoir, wherein to reduce the braking force, brake fluid is discharged from the braking device via the cross-section adjusting member, in at least one of a controlled and regulated manner, into the intermediate reservoir and is delivered to the main brake cylinder using the delivery device;

wherein the brake system is configured so that the discharge of the brake fluid from the braking device of the brake system takes place, at least at times, at a discharge volume flow that is greater than a maximum delivery volume flow of the delivery device, and when a certain operating state of the braking system occurs, the discharge volume flow is reduced, and wherein the cross-section adjusting member equalizes the pressure discharged from the at least one braking device using at least one valve.

16. The brake system as recited in claim 15, wherein the delivery device is connected to at least four braking devices via the cross-section adjusting member and an intermediate reservoir, wherein to reduce the braking force, brake fluid is discharged from the at least four braking devices via the cross-section adjusting member, in at least one of a controlled and regulated manner, into the intermediate reservoir and is delivered to the main brake cylinder using the delivery device.

\* \* \* \* \*